United States Patent
Xu et al.

(10) Patent No.: US 10,756,621 B2
(45) Date of Patent: Aug. 25, 2020

(54) VOLTAGE REGULATORS WITH CONTROLLED OUTPUT VOLTAGE AND THE METHOD THEREOF

(71) Applicant: Chengdu Monolithic Power Systems Co. Ltd., Chengdu (CN)

(72) Inventors: Binci Xu, Hangzhou (CN); Yongliang Wang, Saratoga, CA (US); Tao Zhao, San Jose, CA (US); Lijie Jiang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/389,892

(22) Filed: Apr. 19, 2019

(65) Prior Publication Data

US 2019/0341843 A1 Nov. 7, 2019

(30) Foreign Application Priority Data

May 2, 2018 (CN) .......................... 2018 1 0409564

(51) Int. Cl.
*H02M 3/156* (2006.01)
*H02M 3/158* (2006.01)
*H02M 1/00* (2006.01)
*H02M 3/04* (2006.01)

(52) U.S. Cl.
CPC .............. *H02M 3/04* (2013.01); *H02M 1/00* (2013.01); *H02M 2001/0009* (2013.01); *H02M 2001/0025* (2013.01)

(58) Field of Classification Search
CPC ....... H02M 3/156; H02M 3/158–1588; H02M 2001/0009; H02M 2001/0025
See application file for complete search history.

(56) References Cited

U.S. PATENT DOCUMENTS

| | | | | |
|---|---|---|---|---|
| 5,306,235 A | * | 4/1994 | Haynes | A61N 1/30 604/20 |
| RE38,906 E | * | 12/2005 | Hawkes | H02M 3/156 323/282 |
| 7,317,306 B2 | * | 1/2008 | Fite | H02M 3/156 323/275 |
| 8,395,368 B2 | * | 3/2013 | Ouyang | H02M 3/1588 323/259 |
| 9,473,027 B2 | | 10/2016 | Dong | |
| 9,696,350 B2 | * | 7/2017 | Burton | H02M 3/157 |
| 2002/0125871 A1 | * | 9/2002 | Groom | H02M 3/156 323/284 |
| 2012/0153055 A1 | * | 6/2012 | Imai | B05B 5/0255 239/690 |
| 2013/0193939 A1 | * | 8/2013 | Sakaguchi | G05F 1/5735 323/277 |

(Continued)

OTHER PUBLICATIONS

U.S. Appl. No. 15/938,936, filed Mar. 28, 2018, Monolithic Power Systems.

*Primary Examiner* — Thienvu V Tran
*Assistant Examiner* — Sisay G Tiku
(74) *Attorney, Agent, or Firm* — Perkins Coie LLP

(57) ABSTRACT

A voltage regulator provides an output voltage and an output current. The output voltage decreases with an increase of the output current when the output current is lower than a current breaking point, and the output voltage is maintained when the output current reaches the current breaking point.

12 Claims, 4 Drawing Sheets

(56) References Cited

U.S. PATENT DOCUMENTS

2016/0141956 A1* 5/2016 Dong .................... H02M 3/157
                                                  323/271
2019/0199212 A1* 6/2019 Jiang ....................... H02M 1/08
2019/0302818 A1* 10/2019 Liu .......................... G05F 1/565
2019/0305674 A1* 10/2019 Liu .......................... H02M 1/15

* cited by examiner

VOLTAGE REGULATORS WITH CONTROLLED OUTPUT VOLTAGE AND THE METHOD THEREOF

CROSS-REFERENCE TO RELATED APPLICATIONS

This application claims priority to and the benefit of Chinese Patent Application No. 201810409564.9, filed May 2, 2018, which is incorporated herein by reference in its entirety.

FIELD

The present invention relates to electronic circuits, more specifically, the present invention relates to voltage regulators and the method thereof.

BACKGROUND

In applications of high current, low voltage microprocessors, the power performance, especially the transient response is typical. Adaptive voltage position (AVP) control is widely used to reduce voltage deviations of the output voltage (i.e., the power supply of microprocessors) during the load step to insure the system stability.

The basic principle of traditional AVP control is shown in FIG. 1. An output voltage VO decreases linearly from a voltage value V1 to a voltage value V2, as an output current IO (i.e. load current) increases from a minimum value (e.g., from zero) to a maximum load point Imax, wherein V1 may be a reference voltage set according to a voltage identification code (VID) from a processor load.

With fast development of the microprocessor, power supply with higher voltage level is needed. The output voltage at full load may be very low, which may be close to a lowest threshold of the CPU operational voltage, if traditional AVP control is adopted. Thus, an improved voltage regulator with better output voltage control is in high demand.

SUMMARY

In accomplishing the above and other objects, there has been provided, in accordance with an embodiment of the present invention, a voltage regulator, comprising: a power switching circuit, configured to provide an output voltage and an output current in response to an input voltage; and a control circuit, configured to generate a control signal to control the power switching circuit in response to a differential voltage indicative of the output voltage, a sense current indicative of the output current, and a threshold signal, so that the output voltage decreases as an increase of the output current when the output current is lower than a current breaking point, and the output voltage is maintained when the output current reaches the current breaking point, wherein the current breaking point is relevant to the threshold signal.

In addition, there has been provided, in accordance with an embodiment of the present invention, a voltage regulating method, comprising: generating an output voltage and an output current in response to an input voltage; and controlling the output voltage in response to a differential voltage indicative of the output voltage, a sense current indicative of the output current and a threshold signal, so that the output voltage decreases as an increase of the output current when the output current is lower than a current breaking point, and the output voltage is maintained when the output current reaches the current breaking point; the current breaking point being relevant to the threshold signal.

Furthermore, there has been provided, in accordance with an embodiment of the present invention, a control circuit used in a voltage regulator, the voltage regulator configured to generate an output voltage and an output current in response to an input voltage, the control circuit configured to control the voltage regulator based on a differential voltage indicative of the output voltage, a sense current indicative of the output current and a threshold signal, so that the output voltage: is operable to decrease as an increase of the output current when the output current is lower than a current breaking point; and is maintained when the output current reaches the current breaking point; the current breaking point being relevant to the threshold signal.

The use of the similar reference label in different drawings indicates the same of like components.

DETAILED DESCRIPTION

Embodiments of circuits for voltage regulator are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
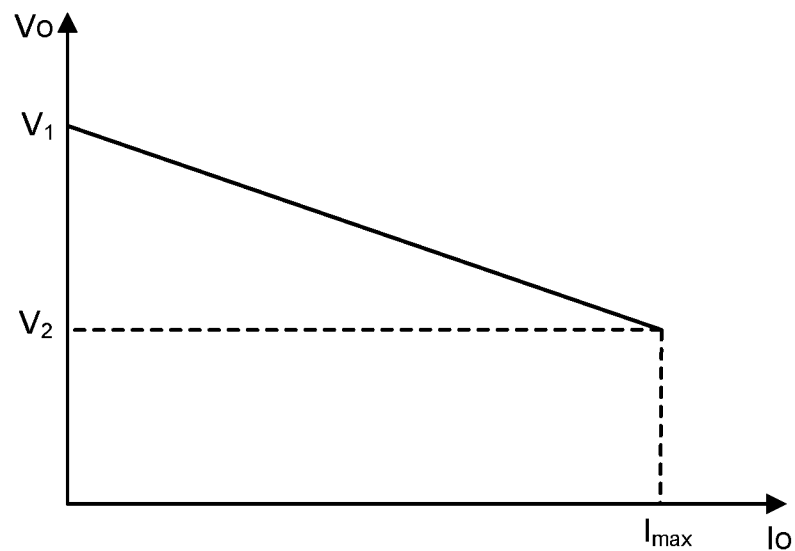
FIG. 1 schematically shows a basic principle of traditional AVP control.
Figure 2:
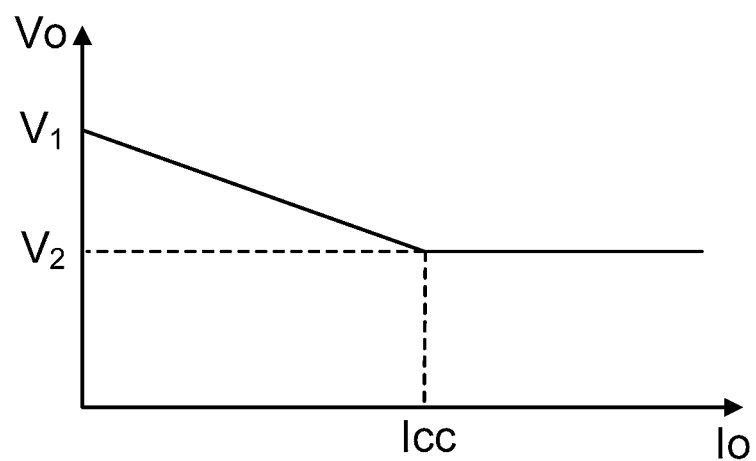
FIG. 2 schematically shows timing waveforms of an output voltage VO and an output current IO of a voltage regulator in accordance with an embodiment of the present invention.

FIG. 2 schematically shows timing waveforms of an output voltage VO and an output current IO of a voltage regulator in accordance with an embodiment of the present invention. When the output current IO (i.e. load current) is at a minimum value, the output voltage VO is at a reference voltage V1. As the output current IO increases, the output voltage VO decreases, until the output current IO reaches a current breaking point ICC. Then the output voltage is maintained at a set voltage V2 even though the output current IO keeps increasing. That is, the output voltage VO decreases as the increase of the output current IO when the output current IO is lower than the current breaking point ICC; and the output voltage VO is maintained at the set voltage V2 (i.e., the output voltage no longer decreases)

when the output current IO reaches (and/or is higher than) the current breaking point ICC.

Figure 3:
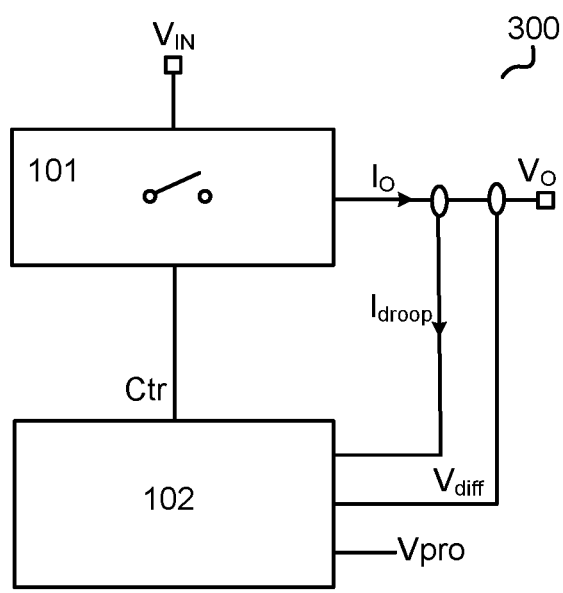
FIG. 3 schematically shows a voltage regulator 300 in accordance with an embodiment of the present invention.

FIG. 3 schematically shows a voltage regulator 300 in accordance with an embodiment of the present invention. The voltage regulator 300 generates an output voltage VO and an output current IO with a relationship shown in FIG. 2. In the embodiment of FIG. 3, the voltage regulator 300 comprises: a power switching circuit 101, configured to provide an output voltage VO and an output current IO in response to an input voltage VIN; and a control circuit 102, configured to generate a control signal Ctr to control the power switching circuit 101 in response to a differential voltage Vdiff indicative of the output voltage VO, a sense current Idroop indicative of the output current IO, and a threshold signal Vpro, so that the output voltage VO decreases as an increase of the output current when the output current IO is lower than a current breaking point ICC, and the output voltage VO is maintained when the output current IO reaches (and/or is higher than) the current breaking point ICC, wherein the current breaking point ICC is relevant to the threshold signal Vpro.

In one embodiment, the threshold signal Vpro is programmable. It is programmed under different requirements in actual applications, to set corresponding voltage value V2. In one embodiment, Vpro=V1−V2.

Figure 4:
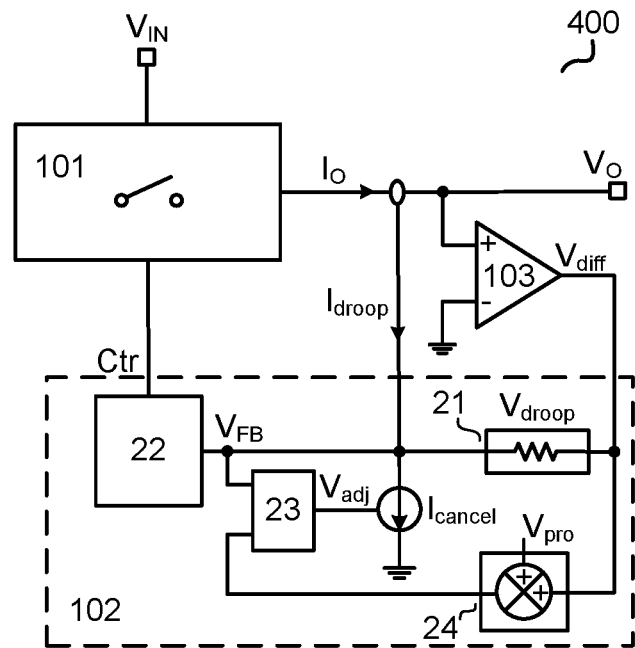
FIG. 4 schematically shows a voltage regulator 400 in accordance with an embodiment of the present invention.

FIG. 4 schematically shows a voltage regulator 400 in accordance with an embodiment of the present invention. The voltage regulator 400 in the embodiment of FIG. 4 schematically shows a circuit configuration of the control circuit 102. Specifically, in the embodiment of FIG. 4, the control circuit 102 comprises: a current to voltage converter 21, configured to generate a droop voltage Vdroop across thereupon, wherein the droop voltage Vdroop increases as the increase of the output current IO when the output current IO is lower than the current breaking point ICC, and is maintained when the output current IO reaches (and/or is higher than) the current breaking point ICC; and a logical controller 22, configured to generate the control signal Ctr in response to a sum (i.e., a feedback voltage VFB) of the droop voltage Vdroop and the differential voltage Vdiff.

In the embodiment of FIG. 4, the control circuit 102 further comprises: a PI (proportional integral) circuit 23, configured to generate an adjust signal Vadj in response to the sum of the droop voltage Vdroop and the differential voltage Vdiff, and a sum of the differential voltage Vdiff and the threshold signal Vpro, to adjust the droop voltage Vdroop, so that the droop voltage Vdroop increases as the increase of the output current IO when the output current IO is lower than the current breaking point ICC, and is maintained when the output current IO reaches (and/or is higher than) the current breaking point ICC.

In one embodiment, the adjust signal Vadj is operable to adjust a compensation current Icancel, so that the compensation current Icancel is zero when the output current IO is lower than the current breaking point ICC, and the compensation current Icancel increases from zero as the increase of the output current IO when (and/or after) the output current IO reaches the current breaking point ICC, wherein a difference of the sense current Idroop and the compensation current Icancel flows through the current to voltage converter 21, i.e., the sense current Idroop is distributed to the compensation current Icancel and the current flowing through the current to voltage converter 21, so that the droop voltage Vdroop is generated across the current to voltage converter 21.

In one embodiment, when the output current IO is lower than the current breaking point ICC, the sum of the differential voltage Vdiff and the threshold signal Vpro is higher than the feedback voltage VFB, i.e., Vdiff+Vpro>VFB. The PI circuit 23 performs negative regulation, and the adjust signal Vadj is negatively limited. Accordingly, the adjust signal Vadj is maintained at zero, and the compensation current Icancel is also zero. When the output current IO reaches (and/or is higher than) the current breaking point ICC, the sum of the differential voltage Vdiff and the threshold signal Vpro is lower than the feedback voltage VFB, i.e., Vdiff+Vpro<VFB. The PI circuit 23 would perform positive regulation, and the adjust signal Vadj starts to increase, which controls the compensation current Icancel to increase, and controls the droop voltage Vdroop to decrease. The regulation finally results the sum of the differential voltage Vdiff and the threshold signal Vpro be equal to the feedback voltage VFB, i.e., Vdiff+Vpro=VFB, so as to ensure the stability of the differential voltage Vdiff.

In one embodiment, the control circuit 102 further comprises: an arithmetic unit 24, configured to execute add operation on the differential voltage Vdiff and the threshold signal Vpro, and to deliver the operation result to the PI circuit 23.

In the embodiment of FIG. 4, the voltage regulator 400 further comprises: a differential amplifier 103, configured to generate the differential voltage Vdiff indicative of the output voltage VO.

In one embodiment, the current to voltage converter 21 comprises a resistor.

Figure 5:
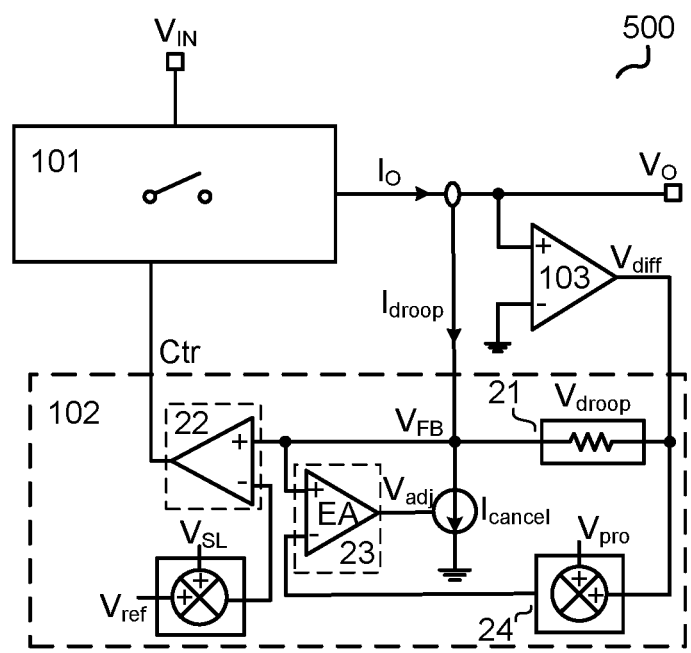
FIG. 5 schematically shows a voltage regulator 500 in accordance with an embodiment of the present invention.

FIG. 5 schematically shows a voltage regulator 500 in accordance with an embodiment of the present invention. The voltage regulator 500 in the embodiment of FIG. 5 schematically shows circuit configurations of the logical controller 22 and the PI circuit 23. Specifically, in the embodiment of FIG. 5, the PI circuit 23 comprises: an error amplifier EA, configured to amplify and integrate a difference between the feedback voltage VFB (i.e., the sum of the droop voltage Vdroop and the differential voltage Vdiff) and the sum of the differential voltage Vdiff and the threshold signal Vpro, to generate the adjust signal Vadj. The logical controller 22 comprises: a comparator, configured to compare the feedback voltage VFB (i.e., the sum of the droop voltage Vdroop and the differential voltage Vdiff) with a sum of a reference voltage Vref and a slope signal VSL, to generate the control signal Ctr.

During the operation of the voltage regulator, when the output current IO is relatively low (e.g., IO is lower than the current breaking point ICC), the compensation current Icancel is zero. All of the sense current Idroop flows through the current to voltage converter 21. The droop voltage Vdroop increases as the increase of the sense current Idroop. In one embodiment, the droop voltage Vdroop is proportional to the sense current Idroop. Because the existence of the logical controller 22, the sum of the droop voltage Vdroop and the differential voltage Vdiff follows the sum of the reference voltage Vref and the slope signal VSL. Consequently, the differential voltage Vdiff decreases as the increase of the output current IO. That is, the output voltage VO decreases as the increase of the output current IO. When the output current IO reaches (and/or is higher than) the current breaking point ICC, the compensation current Icancel increases from zero as the increase of the output current IO. The difference of the sense current Idroop and the compensation current Icancel flows through the current to voltage converter 21. Then the increase of the output current IO is counteracted by the compensation current Icancel; and the current flowing through the current to voltage converter 21 remains unchanged, so does the droop voltage Vdroop.

Thus, the droop voltage Vdroop would not be changed as the variation of the output current IO. It is maintained.

Several embodiments of the foregoing voltage regulator generate an output voltage and an output current with the relationship shown in FIG. 2. When the output current (i.e. the load current) is relatively large, the output voltage is maintained at a set voltage value, so that the system would have continuous voltage supply even at heavy load conditions. The set voltage value may be changed by adjusting the threshold signal Vpro, which satisfies: Vpro=V1−V2.

Figure 6:
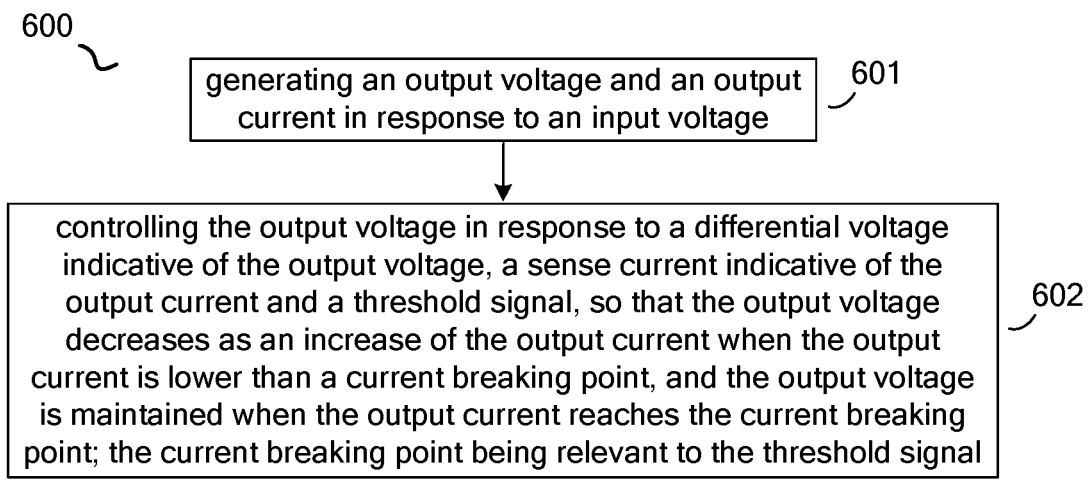
FIG. 6 schematically shows a flowchart 600 of a voltage regulating method used in a power supply in accordance with an embodiment of the present invention.

FIG. 6 schematically shows a flowchart 600 of a voltage regulating method used in a power supply in accordance with an embodiment of the present invention. The method comprising:

Step 601, generating an output voltage and an output current in response to an input voltage. And Step 602, controlling the output voltage in response to a differential voltage indicative of the output voltage, a sense current indicative of the output current and a threshold signal, so that the output voltage decreases as an increase of the output current when the output current is lower than a current breaking point, and the output voltage is maintained when the output current reaches (and/or is higher than) the current breaking point; the current breaking point being relevant to the threshold signal.

In one embodiment, "controlling the output voltage in response to a differential voltage indicative of the output voltage, a sense current indicative of the output current and a threshold signal" comprises: converting the sense current into a droop voltage by way of a current to voltage converter; generating an adjust signal by amplifying and integrating a difference between a sum of the droop voltage and the differential voltage, and a sum of the differential voltage and the threshold signal, to adjust the droop voltage, so that the droop voltage increases as the increase of the output current when the output current is lower than the current breaking point, and the droop voltage is kept unchanged when the output current reaches (and/or is higher than) the current breaking point; and adjusting the output voltage in response to the droop voltage and the differential voltage.

In one embodiment, "controlling the output voltage in response to a differential voltage indicative of the output voltage, a sense current indicative of the output current and a threshold signal" comprises: converting the sense current into a droop voltage by way of a current to voltage converter; generating an adjust signal by amplifying and integrating a difference between the sum of the droop voltage and the differential voltage, and the sum of the differential voltage and the threshold signal, to adjust a compensation current, so that the compensation current is zero when the output current is lower than the current breaking point, and the compensation current increases from zero as the increase of the output current when the output current reaches (and/or is higher than) the current breaking point, wherein a difference of the sense current and the compensation current flows through the current to voltage converter, so that the droop voltage is generated across the current to voltage converter; and adjusting the output voltage by controlling the sum of the droop voltage and the differential voltage to follow a sum of a reference voltage and a slope signal.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A voltage regulator, comprising:
a power switching circuit, configured to provide an output voltage and an output current in response to an input voltage; and
a control circuit, configured to generate a control signal to control the power switching circuit in response to a differential voltage indicative of the output voltage, a sense current indicative of the output current, and a threshold signal, so that the output voltage decreases as an increase of the output current when the output current is lower than a current breaking point, and the output voltage is maintained when the output current reaches the current breaking point, wherein the current breaking point is relevant to the threshold signal; wherein the control circuit comprises:
a current to voltage converter, configured to generate a droop voltage across thereupon, wherein the droop voltage increases as the increase of the output current when the output current is lower than the current breaking point, and is maintained when the output current reaches the current breaking point; and
a logical controller, configured to generate the control signal in response to a sum of the droop voltage and the differential voltage.

2. The voltage regulator of claim 1, wherein the control circuit further comprises:
a PI circuit, configured to generate an adjust signal in response to the sum of the droop voltage and the differential voltage, and a sum of the differential voltage and the threshold signal, to adjust the droop voltage, so that the droop voltage increases as the increase of the output current when the output current is lower than the current breaking point, and is maintained when the output current reaches the current breaking point.

3. The voltage regulator of claim 2, wherein:
the adjust signal is operable to adjust a compensation current, so that the compensation current is zero when the output current is lower than the current breaking point, and the compensation current increases from zero as the increase of the output current when the output current reaches the current breaking point; and wherein
a difference of the sense current and the compensation current flows through the current to voltage converter, so that the droop voltage is generated across the current to voltage converter.

4. The voltage regulator of claim 2, wherein the PI circuit comprises:
an error amplifier, configured to amplify and integrate a difference between the sum of the droop voltage and the differential voltage, and the sum of the differential voltage and the threshold signal, to generate the adjust signal.

5. The voltage regulator of claim 1, wherein the logical controller comprises:

a comparator, configured to compare the sum of the droop voltage and the differential voltage with a sum of a reference voltage and a slope signal, to generate the control signal.

6. A voltage regulating method, comprising:
generating an output voltage and an output current in response to an input voltage; and
controlling the output voltage in response to a differential voltage indicative of the output voltage, a sense current indicative of the output current and a threshold signal, so that the output voltage decreases as an increase of the output current when the output current is lower than a current breaking point, and the output voltage is maintained when the output current reaches the current breaking point; the current breaking point being relevant to the threshold signal; wherein controlling the output voltage in response to the differential voltage indicative of the output voltage, the sense current indicative of the output current and the threshold signal comprises:
converting the sense current into a droop voltage by way of a current to voltage converter;
generating an adjust signal by amplifying and integrating a difference between a sum of the droop voltage and the differential voltage, and a sum of the differential voltage and the threshold signal, to adjust the droop voltage, so that the droop voltage increases as the increase of the output current when the output current is lower than the current breaking point, and the droop voltage is kept unchanged when the output current reaches the current breaking point; and
adjusting the output voltage in response to the droop voltage and the differential voltage.

7. The voltage regulating method of claim 6, wherein controlling the output voltage in response to the differential voltage indicative of the output voltage, the sense current indicative of the output current and the threshold signal comprises:
converting the sense current into the droop voltage by way of the current to voltage converter;
generating the adjust signal by amplifying and integrating the difference between the sum of the droop voltage and the differential voltage, and the sum of the differential voltage and the threshold signal, to adjust a compensation current, so that the compensation current is zero when the output current is lower than the current breaking point, and the compensation current increases from zero as the increase of the output current when the output current reaches the current breaking point, wherein a difference of the sense current and the compensation current flows through the current to voltage converter, so that the droop voltage is generated across the current to voltage converter; and
adjusting the output voltage by controlling the sum of the droop voltage and the differential voltage to follow a sum of a reference voltage and a slope signal.

8. A control circuit used in a voltage regulator, the voltage regulator configured to generate an output voltage and an output current in response to an input voltage, the control circuit configured to control the voltage regulator based on a differential voltage indicative of the output voltage, a sense current indicative of the output current and a threshold signal, so that the output voltage:
is operable to decrease as an increase of the output current when the output current is lower than a current breaking point; and
is maintained when the output current reaches the current breaking point; the current breaking point being relevant to the threshold signal; the control circuit comprising:
a current to voltage converter, configured to generate a droop voltage across thereupon, wherein the droop voltage increases as the increase of the output current when the output current is lower than the current breaking point, and is maintained when the output current reaches the current breaking point; and
a logical controller, configured to generate the control signal in response to a sum of the droop voltage and the differential voltage.

9. The control circuit of claim 8, further comprising:
a PI circuit, configured to generate an adjust signal in response to the sum of the droop voltage and the differential voltage, and a sum of the differential voltage and the threshold signal, to adjust the droop voltage, so that the droop voltage increases as the increase of the output current when the output current is lower than the current breaking point, and is maintained when the output current reaches the current breaking point.

10. The control circuit of claim 9, wherein:
the adjust signal is operable to adjust a compensation current, so that the compensation current is zero when the output current is lower than the current breaking point, and the compensation current increases from zero as the increase of the output current when the output current reaches the current breaking point; and wherein
a difference of the sense current and the compensation current flows through the current to voltage converter, so that the droop voltage is generated across the current to voltage converter.

11. The control circuit of claim 9, wherein the PI circuit comprises:
an error amplifier, configured to amplify and integrate a difference between the sum of the droop voltage and the differential voltage, and the sum of the differential voltage and the threshold signal, to generate the adjust signal.

12. The control circuit of claim 8, wherein the logical controller comprises:
a comparator, configured to compare the sum of the droop voltage and the differential voltage with a sum of a reference voltage and a slope signal, to generate the control signal.

* * * * *